United States Patent [19]
Kim

[11] Patent Number: 6,072,550
[45] Date of Patent: *Jun. 6, 2000

[54] LIQUID CRYSTAL DISPLAY HAVING RESISTIVE ELECTROSTATIC DISCHARGE PROTECTION DEVICES WITH RESISTANCE NO GREATER THAN 1 MOHM AND METHOD OF FABRICATION

[75] Inventor: Dong-Gyu Kim, Kyungki-do, Rep. of Korea

[73] Assignee: Samsung Electronics Co., Ltd., Rep. of Korea

[ * ] Notice: This patent is subject to a terminal disclaimer.

[21] Appl. No.: 08/872,860

[22] Filed: Jun. 11, 1997

[30] Foreign Application Priority Data

Jun. 11, 1996 [KR] Rep. of Korea ............ 96-20750

[51] Int. Cl.[7] .............. G02F 1/1333; G02F 1/1343; G02F 1/13
[52] U.S. Cl. ................. 349/40; 349/139; 349/187; 349/54; 349/192
[58] Field of Search .............. 349/40, 139, 187, 349/43, 54, 192

[56] References Cited

U.S. PATENT DOCUMENTS

| | | | |
|---|---|---|---|
| 5,504,348 | 4/1996 | Yoshida et al. ............ | 349/43 |
| 5,650,834 | 7/1997 | Nakagawa et al. ......... | 349/139 |
| 5,691,787 | 11/1997 | Shimada et al. ........... | 349/40 |
| 5,828,428 | 10/1998 | Kim et al. ................. | 349/40 |

*Primary Examiner*—William L. Sikes
*Assistant Examiner*—Kari M. Horney
*Attorney, Agent, or Firm*—Myers Bigel Sibley & Sajovec

[57] ABSTRACT

A liquid crystal display (LCD) panel includes a substrate and a plurality of gate lines and data lines on the substrate, the gate lines extending along a first direction, the data lines extending along a second direction transverse to the first direction, the data lines and the gate lines crossing in an active region. A discharge bus is disposed on the substrate, extending around the active region, crossing the data lines and the gate lines. A plurality of resistive elements are disposed on the substrate, a respective one of which connects a respective one of the plurality of gate lines and data lines to the discharge bus. Preferably, a respective one of the resistive elements provides a resistance between the discharge bus and the data line or gate line connected thereto no greater than 1 Mohms. The plurality of resistive elements may include a plurality of resistive regions on a gate insulation layer. The resistive regions may be formed concurrently with a plurality of TFTs, and may include a noncrystalline silicon region. A silicide region may be disposed on the noncrystalline silicon region. According to other embodiments, a respective one of the resistive regions includes a first noncrystalline silicon region on the gate insulation layer and a second noncrystalline silicon region on the first noncrystalline silicon region, the second noncrystalline silicon region having a dopant concentration greater than the first noncrystalline silicon region. According to another embodiment, a respective one of the resistive regions includes a silicide region on the insulation layer.

27 Claims, 6 Drawing Sheets

LIQUID CRYSTAL DISPLAY HAVING RESISTIVE ELECTROSTATIC DISCHARGE PROTECTION DEVICES WITH RESISTANCE NO GREATER THAN 1 MOHM AND METHOD OF FABRICATION

FIELD OF THE INVENTION

The present invention relates to liquid crystal display (LCD) panels and methods of fabrication therefor, more particularly, to LCDs having electrostatic discharge protection and methods of fabrication therefor.

BACKGROUND OF THE INVENTION

In a typical thin film transistor (TFT) liquid crystal display (LCD), a plurality of pixels are formed in an active region of a substrate. Each pixel typically includes a pixel electrode connected to a thin film transistor. Gate lines and data lines typically are connected to gate electrodes and source electrodes, respectively, of the thin film transistors, and a pad may be connected to each of the gate lines and the data lines for receiving a signal for driving the gate electrodes and source electrodes. These pads typically are formed in an out lead bonding (OLB) pad region on the substrate, at the periphery of the active region.

A TFT substrate may be exposed to electrostatic discharge during processing and handling. This may cause destruction of the TFTs or deterioration of their electrical characteristics. To prevent these problems, wiring patterns on the substrate may be connected to a shorting bar or a conductive ring, either directly or indirectly through resistors, diodes or TFTs to allow the wiring to be held at a common potential.

As shown, a plurality of gate lines 1 and a plurality of data lines 2 are formed on a substrate consisting of an active region A and a pad region B. A plurality of TFTs and a plurality of pixel electrodes are formed in the active region A. A plurality of gate pads 3 and data pads 4, respectively connected to the gate lines 1 and the data lines 2, are formed in a pad region B. Connecting members such as the shorting bars 5 and 6 illustrated in FIG. 1 and the conductive rings 80 and 8 illustrated in FIGS. 2 and 3 may be formed in the pad region B of the substrate.

Figure 1:
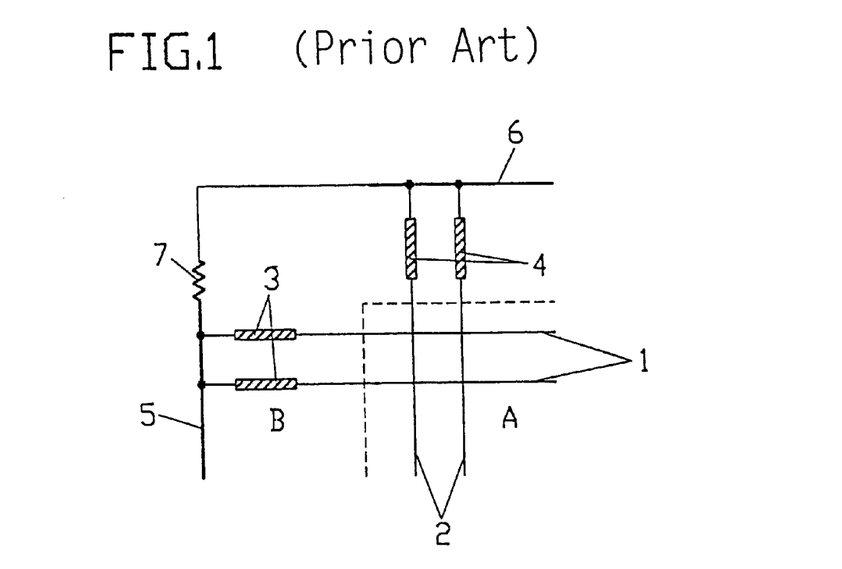
FIGS. 1–3 are schematic diagrams illustrating various conventional configurations for protecting a liquid crystal display (LCD) panel against electrostatic discharge.
Figure 2:
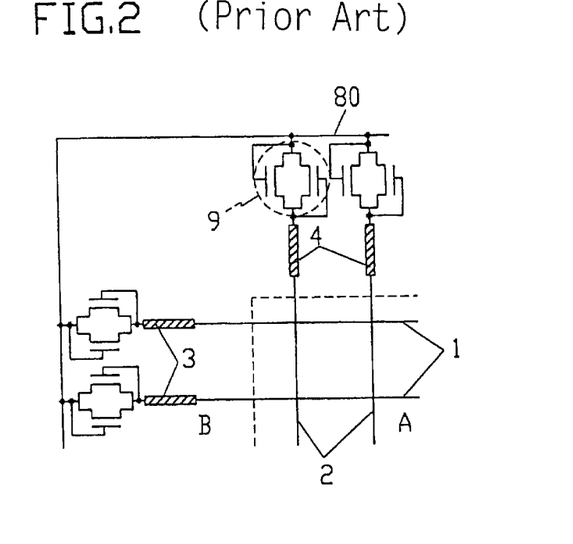

As shown in FIG. 1, the connecting member may include a gate shorting bar 6 and a data shorting bar 6 which are connected to gate pads 3 and the data pads 4, respectively. The gate shorting bar 5 and the data shorting bar 6 are connected to each other through a resistor 7. As shown in FIG. 2, a conductive ring 80 may be connected to the gate pads 3 and the data pads 4 through transmission gates 9. A first gate terminal and a common drain terminal of a transmission gate 9 are connected to the ring 80, and a second gate terminal and a common source terminal of the transmission gate 9 are connected to a gate pad 3 or a data pad 4.

Figure 3:
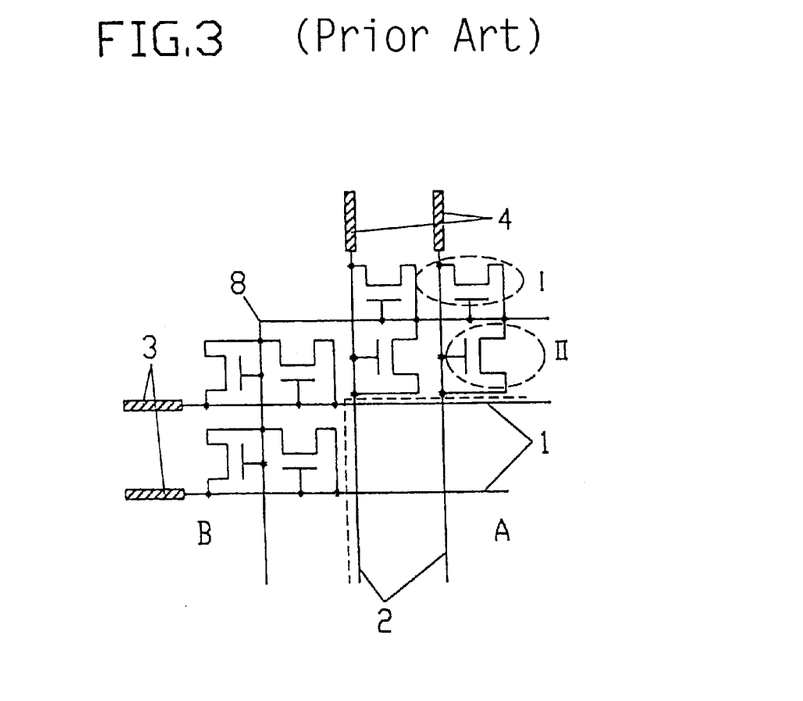

As shown in FIG. 3, a conductive ring 8 may be formed which crosses the gate lines 1 and the data lines 2 and which is insulated from the gate lines 1 and the data lines 2. First and second thin film transistors I and II connect the ring 8 and the gate lines 1 and the data lines 2. A gate and a drain of the first thin film transistor I are connected to the ring 8, while the source of the first thin film transistor I is connected to the gate line 1 or the data line 2. A gate and a source of the second thin film transistor II are connected to the gate line 1 or the data line 2, while the drain at the second thin film transistor II is connected to the ring 8.

For the conventional electrostatic discharge protection circuit of FIG. 1, the shorting bars typically are disconnected from the gate lines and the data lines in order to test for wiring defects. Unfortunately, the substrate may be further exposed to electrostatic charges subsequent to testing for defects, thus exposing the devices on the substrate to potential damage. For the configurations of FIGS. 2 and 3, electrostatic charges may be generated near a pad of a certain gate line or data line, causing transmission gates and the TFTs near the pad to be destroyed and disconnecting the gate line or the data line from the ring. Charge currents may then flow into the active region through the wiring and may destroy TFTs or other elements.

SUMMARY OF THE INVENTION

In light of the foregoing, it is an object of the present invention to provide liquid crystal display (LCD) panels and methods of fabrication therefor which offer improved protection against electrostatic discharge.

It is another object of the present invention to provide LCD panels and fabrication methods therefor which can provide protection against electrostatic discharge after the panel is tested for wiring defects.

These and other objects, features and advantages are provided according to the present invention by LCD panels and methods of fabrication therefor which have data and gate lines which are connected to a discharge bus by a plurality of resistive elements. The resistive elements may include semiconductor regions which are formed on a gate insulation layer used in constructing the thin-film-transistors (TFTs) of the LCD panel, and may be formed from the same semiconductor layers used to fabricate the channel and/or source/drain regions of the TFTs.

The resistive elements preferably provide a resistance between 5 Kohms and 1 Mohm. Because resistive elements are used to connect the gate and data lines to the discharge bus, the present invention allows testing for wiring defects in the panel without requiring severing of the connecting between the discharge bus and the gate and data lines. Accordingly, protection against electrostatic discharge can be continually provided before, during and after defect testing.

In particular, according to the present invention, a liquid crystal display (LCD) panel includes a substrate and a plurality of gate lines and data lines on the substrate, the gate lines extending along a first direction, the data lines extending along a second direction transverse to the first direction, the data lines and the gate lines crossing in an active region. A discharge bus is disposed on the substrate, extending around the active region, crossing the data lines and the gate lines. A plurality of resistive elements are disposed on the substrate, a respective one of which connects a respective one of the plurality of gate lines to the discharge bus. Preferably, a respective one of the resistive elements provides a resistance between the discharge bus and the data line or gate line connected thereto in a range from approximately 5 Kohms to 1 Mohms.

The data lines and gates lines may cross to define a plurality of pixel regions, and the LCD may further include a plurality of thin-film transistors (TFTs) on the substrate, a respective one of the TFTs being disposed within a respective one of the pixel regions and having a gate electrode connected to a respective one of the gate lines. A gate insulation layer may overlie the gate electrodes of the plurality of TFTs, and the plurality of resistive elements may include a plurality of resistive regions on the gate insulation layer.

A respective one of the resistive regions may include a noncrystalline silicon region, and a silicide region may be disposed on the noncrystalline silicon region. According to other embodiments, a respective one of the resistive regions includes a first noncrystalline silicon region on the gate insulation layer and a second noncrystalline silicon region on the first noncrystalline silicon region, the second noncrystalline silicon region having a dopant concentration greater than the first noncrystalline silicon region. According to another embodiment, a respective one of the resistive regions includes a silicide region on the insulation layer.

According to method aspects of the present invention, a plurality of gate lines and data lines, a discharge bus and a plurality of resistive elements are formed on a substrate, the gate lines extending along a first direction, the data lines extending along a second direction transverse to the first direction, the gate and data lines crossing to define an active region. The discharge bus extends around the active region and crosses the data lines and the gate lines. A respective one of the resistive elements connects a respective one of the plurality of gate lines to the discharge bus. The plurality of gate lines may have gate electrodes extending therefrom. A plurality of thin-film transistors may be formed on the substrate, a respective one of which includes one of the gate electrodes, a gate insulation layer on the gate electrode, and a semiconductor region on the gate insulation layer overlying the gate electrode. The plurality of resistive regions may be formed on the gate insulation layer from the same layer as the semiconductor region of the thin film transistors.

According to a first method aspect, a first conductive layer is formed on the substrate and is patterned to form a gate line having a gate electrode region extending laterally therefrom and to form a first discharge bus line substantially parallel to the gate line. An insulation layer is formed on the substrate, covering the gate line. A semiconductor layer is formed on the insulation layer and is patterned to leave a first semiconductor region overlying the gate electrode region of the gate line, a second semiconductor region laterally adjacent the gate line, and a third semiconductor region laterally adjacent the first discharge bus line. Portions of the insulation layer are removed to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole.

A second conductive layer is formed on the substrate, contacting the exposed portions of the gate line and the first discharge bus line through the first, second and third contact holes. The second conductive layer is patterned to form: a data line which is transverse to the gate line and the first discharge bus line, which contacts the third semiconductor region, and which has a extension which overlies a first portion of the first semiconductor region; a second discharge bus line disposed transverse to the gate line and the first discharge bus line, which contacts the first discharge bus line through the third contact hole, and which has an extension which overlies the second semiconductor region and contacts the gate line through the first contact hole; a first interconnecting region which overlies a portion of the third semiconductor region apart from the data line and which contacts the first discharge bus line through the second contact hole; and a second interconnecting region which overlies a portion of the first semiconductor region apart from the extension of the data line.

A portion of the first semiconductor region is removed to form spaced apart source drain regions overlying a channel region, the second interconnecting region overlying a first one of the spaced apart source/drain regions and the extension of the data line overlying a second one of the spaced apart source/drain regions. A portion of the extension of the second discharge bus line overlying the second semiconductor region is removed to form a first electrode extending from the second discharge bus line which contacts the second semiconductor region and to form a second electrode connecting the second semiconductor region and the gate line.

According to a second method aspect, a first conductive layer is formed on the substrate and is patterned to form a gate line having a gate electrode region extending laterally therefrom and to form a first discharge bus line substantially parallel to the gate line. An insulation layer is formed on the substrate, covering the gate line. A first semiconductor layer is formed on the insulation layer. An etch stopper layer is formed on the semiconductor layer and is patterned to form an etch stopper region overlying the gate electrode region of the gate line. A second semiconductor layer is then formed on the substrate and the first and second semiconductor layers are patterned to leave a first semiconductor region overlying the gate electrode region of the gate line, a second semiconductor region laterally adjacent the gate line, and a third semiconductor region laterally adjacent the first discharge bus line. Portions of the insulation layer are then removed to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole.

A second conductive layer is formed on the substrate, contacting the exposed portions of the gate line and the first discharge bus line through the first, second and third contact holes. The second conductive layer is then patterned to form: a data line which is transverse to the gate line and the first discharge bus line, which contacts the third semiconductor region, and which has a extension which overlies a first portion of the first semiconductor region; a second discharge bus line disposed transverse to the gate line and the first discharge bus line, which contacts the first discharge bus line through the third contact hole, and which has an extension which overlies the second semiconductor region and contacts the gate line through the first contact hole; a first interconnecting region which overlies a portion of the third semiconductor region apart from the data line and which contacts the first discharge bus line through the second contact hole; and a second interconnecting region which overlies a portion of the first semiconductor region apart from the extension of the data line.

A portion of the first semiconductor region overlying the etch stopper region is then removed to form spaced apart source drain regions overlying a channel region, the second interconnecting region overlying a first one of the spaced apart source/drain regions and the extension of the data line overlying a second one of the spaced apart source/drain regions. A portion of the extension of the second discharge bus line overlying the second semiconductor region is removed to form a first electrode extending from the second discharge bus line which contacts the second semiconductor region and to form a second electrode connecting the second semiconductor region and the gate line.

According to a third method aspect, a first conductive layer is formed on the substrate and is patterned to form a gate line having a gate electrode region extending laterally therefrom and to form a first discharge bus line substantially parallel to the gate line. An insulation layer is formed on the substrate, covering the gate line. A first semiconductor layer is formed on the insulation layer. An etch stopper layer is formed on the semiconductor layer and is patterned to form an etch stopper region overlying the gate electrode region of the gate line. A second semiconductor layer is formed on the substrate and the first and second semiconductor layers are patterned to leave a first semiconductor region overlying the gate electrode region of the gate line, a second semiconductor region laterally adjacent the gate line, and a third semiconductor region laterally adjacent the first discharge bus line, the first semiconductor region including a channel region formed from the first semiconductor layer overlying the gate electrode region of the gate line and spaced apart source/drain regions formed from the second semiconductor layer overlying the channel region and disposed on respective sides of the etch stopper region. Portions of the insulation layer are removed to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole.

A second conductive layer is formed on the substrate, contacting the exposed portions of the gate line and the first discharge bus line through the first, second and third contact holes. The second conductive layer is patterned to form: a data line which is transverse to the gate line and the first discharge bus line, which contacts the third semiconductor region, and which has a extension which overlies a first portion of the first semiconductor region; a second discharge bus line disposed transverse to the gate line and the first discharge bus line, which contacts the first discharge bus line through the third contact hole, and which has an extension which overlies the second semiconductor region; a first interconnecting region which overlies a portion of the second semiconductor region and which contacts the gate line through the first contact hole; a second interconnecting region which overlies a portion of the third semiconductor region apart from the data line and which contacts the first discharge bus line through the second contact hole; and a third interconnecting region which overlies a portion of the first semiconductor region apart from the extension of the data line.

According to a fourth method aspect, a first conductive layer is formed on the substrate and is patterned to form a gate line having a gate electrode region extending laterally therefrom and to form a first discharge bus line substantially parallel to the gate line. An insulation layer is formed on the substrate, covering the gate line. A semiconductor layer is formed on the insulation layer and an etch stopper layer is formed on the semiconductor layer. The etch stopper layer is patterned to form an etch stopper region overlying the gate electrode region of the gate line. Dopant ions are implanted into the semiconductor layer on opposite sides of the etch stopper region, and the semiconductor layer is patterned to leave a first semiconductor region overlying the gate electrode region of the gate line, a second semiconductor region laterally adjacent the gate line, and a third semiconductor region laterally adjacent the first discharge bus line, the first semiconductor region including a channel region underlying the etch stopper region and disposed between spaced apart source/drain regions, the spaced apart source/drain regions having a higher dopant concentration than the channel region. Portions of the insulation layer are removed to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole.

A second conductive layer is formed on the substrate, contacting the exposed portions of the gate line and the first discharge bus line through the first, second and third contact holes. The second conductive layer is patterned to form: a data line which is transverse to the gate line and the first discharge bus line, which contacts the third semiconductor region, and which has a extension which overlies a first portion of the first semiconductor region; a second discharge bus line disposed transverse to the gate line and the first discharge bus line, which contacts the first discharge bus line through the third contact hole, and which has an extension which overlies the second semiconductor region; a first interconnecting region which overlies a portion of the second semiconductor region and which contacts the gate line through the first contact hole; a second interconnecting region which overlies a portion of the third semiconductor region apart from the data line and which contacts the first discharge bus line through the second contact hole; and a third interconnecting region which overlies a portion of the first semiconductor region apart from the extension of the data line.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity, and like numbers refer to like elements throughout. Moreover, although reference is made to dopant concentrations of a particular conductivity type, each embodiment described and illustrated herein includes complementary embodiments.

Figure 4:
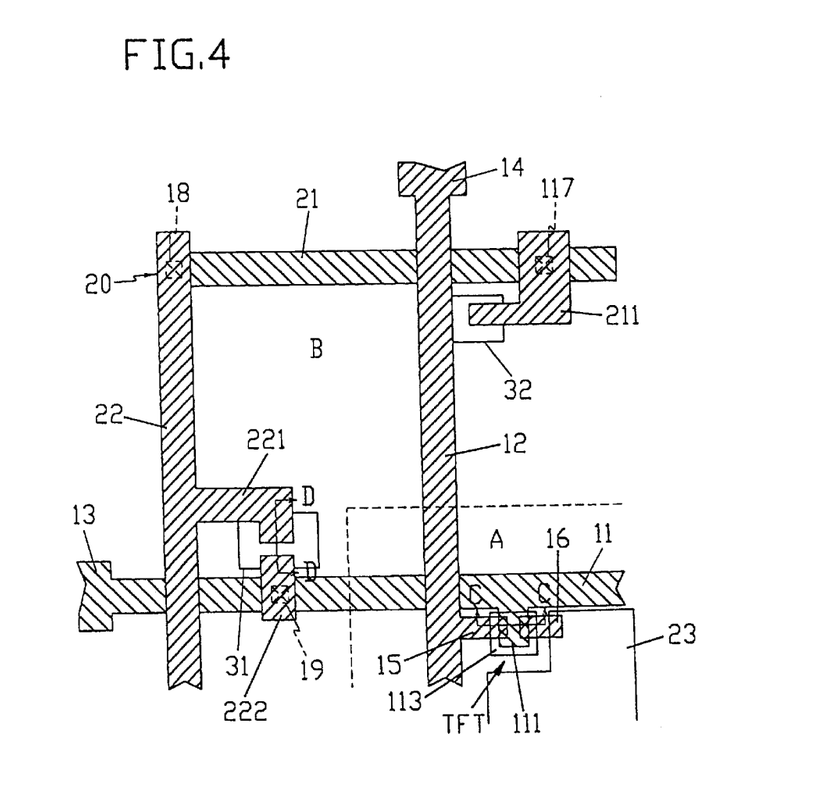
FIG. 4 is a plan view illustrating a layout of an LCD panel according to the present invention.

As shown in FIG. 4, a plurality of gate lines 11 and data lines 12 are formed on a substrate, crossing each other and insulated from each other by an insulation layer. Thin film transistors (TFTs) of an etch-back or etch-stopper type are formed at the positions where the gate lines 11 and the data lines 12 cross in an active region A of the substrate. A thin film transistor (TFT) includes a gate electrode 111 which is a branch of the gate line 11, a source electrode 15 which is a branch of the data line 12, a drain electrode 16 connected to a pixel electrode 23, and a semiconductor pattern 113 which is formed between a gate electrode 111 and the drain the source electrodes 15 and 16. The gate lines 11 and the data lines 12 extend into a pad region B of the substrate, and are connected to a plurality of gate pads 13 and data pads 14, respectively.

A discharge bus 20 including a first discharge bus line 21 and a second discharge bus line 22 is formed in the pad region B. The first discharge bus line 21 is parallel to the gate lines 11 and crosses the data lines 12. The second discharge bus line 22 is parallel to the data lines 12 and crosses the gate lines 11. The first discharge bus line 21 is insulated from the second discharge bus line 22 by an insulation layer. The first discharge bus line 21 and the gate lines 11 may be formed from a single layer, and the discharge bus line 22 and the data lines 42 may be formed from a single layer. The first discharge bus line 21 and the second discharge bus line 22 are connected through a contact hole 18 to form the discharge bus 20.

The discharge bus 20 may be connected to the gate line 11 and the data line 12 through resistive regions 31 and 32 formed in the pad region B. The resistive region 31 is insulated from the gate line 11, and is formed near the gate line 11. One end of the first resistive region 31 is in contact with a first electrode 221 extending from the second discharge bus line 22 of the discharge bus 20, and the other end of the resistive region 31 is in contact with a second electrode 222. The second electrode 222 is insulated from the gate line 11, and may be formed from the same layer as the data line 12. The second electrode 222 is connected to the gate line 11 through a second contact hole 19.

The data line 12 is in contact with one end of the second resistive region 32. The second resistive region 32 is insulated from the gate line 11. The other end of the second resistive region 32 is connected to a third electrode 211. The third electrode 211 is insulated from the gate line 11, and may be formed from the same layer as the data lines 12. The third electrode 211 is connected to the first portion 21 through a third contact hole 117.

Figure 5:
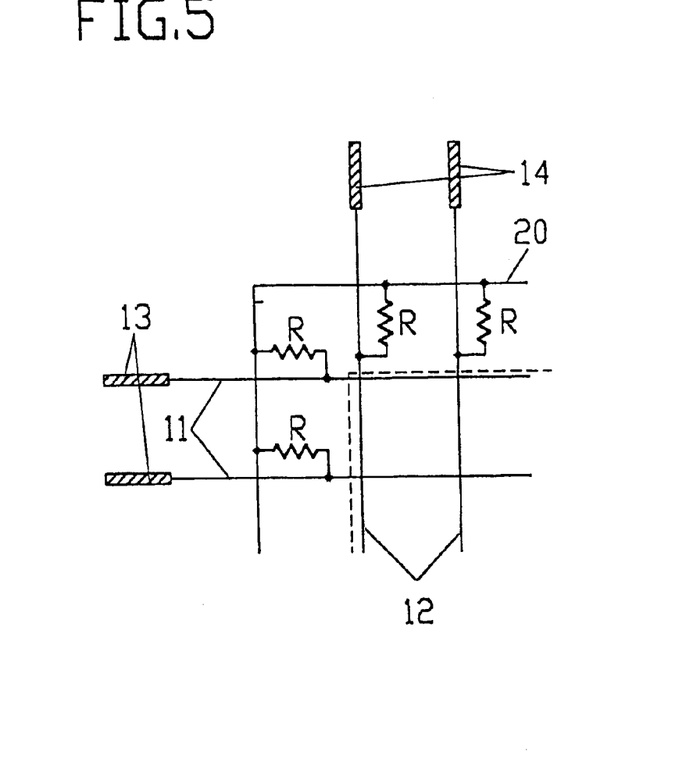
FIG. 5 is a schematic diagram illustrating an LCD panel according to the present invention.

FIG. 5 is an equivalent circuit diagram of above-described structure. Each of the gate lines 11 and the data lines 12 are connected to the discharge bus 20 through a resistive element R. If electrostatic charges are generated at a gate line 11, a data line 12, pads 13 or 14 or the discharge bus 20, the electrostatic charge flows through the resistors R.

Accordingly, the gate lines 11, the data lines 12 and the discharge bus 20 are held at a common potential, and the voltage due to the electrostatic charges may be reduced, for example, to a level of tens of volts. If the discharge bus 20 is grounded, the electrostatic charge may flow in to the ground. Because the current generated when testing the defects of the wiring typically is much smaller than the current arising from electrostatic discharge, if the resistive pattern has sufficient resistance, the current when testing the defects flowing into the discharge bus can be reduced. Therefore, according to the present invention, it is not necessary to separate the discharge bus from the wiring when testing.

Figure 6:
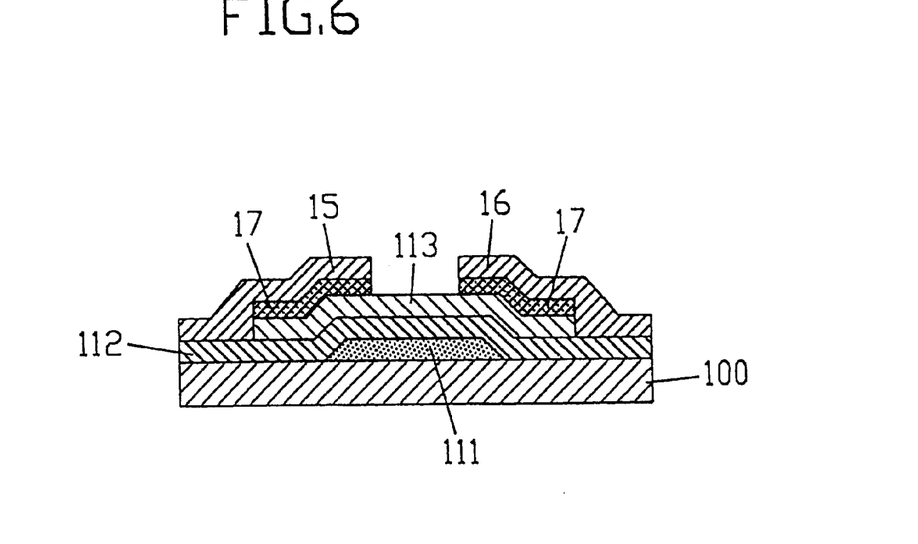
FIG. 6 is a cross-sectional view illustrating an etch back type thin-film-transistor (TFT) according to a first embodiment of the present invention, cut along a line C—C of FIG. 4.
Figure 7:
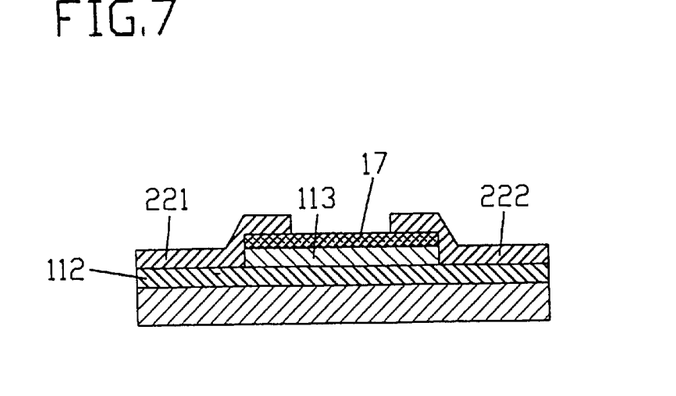
FIG. 7 is a cross-sectional view illustrating a resistive element according to the first embodiment of the present invention, cut along a line D—D of FIG. 4.
Figure 8:
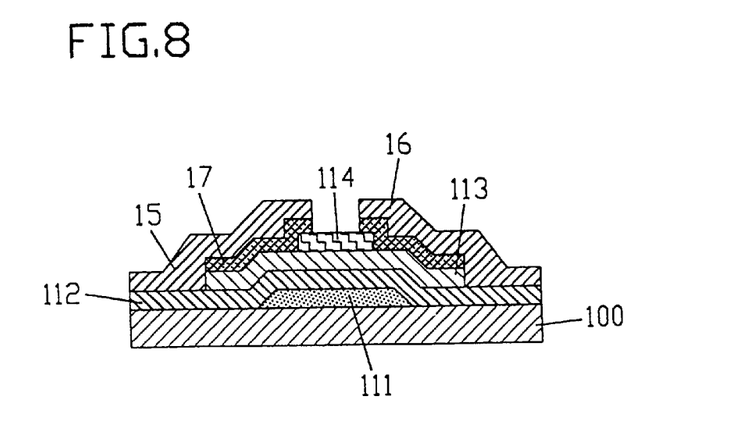
FIG. 8 is a cross-sectional view illustrating an etch-stopper type TFT according to a second embodiment of the present invention, cut along the line C—C in FIG. 4.
Figure 9:
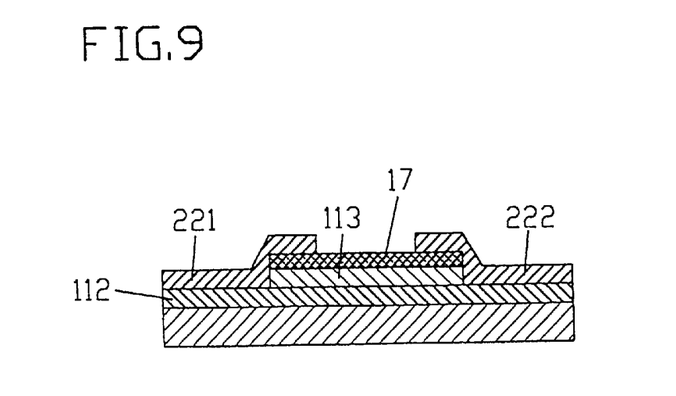
FIG. 9 is a cross-sectional view illustrating a resistive element according to the second embodiment of the present invention, cut along the line D—D in FIG. 4.
Figure 12:
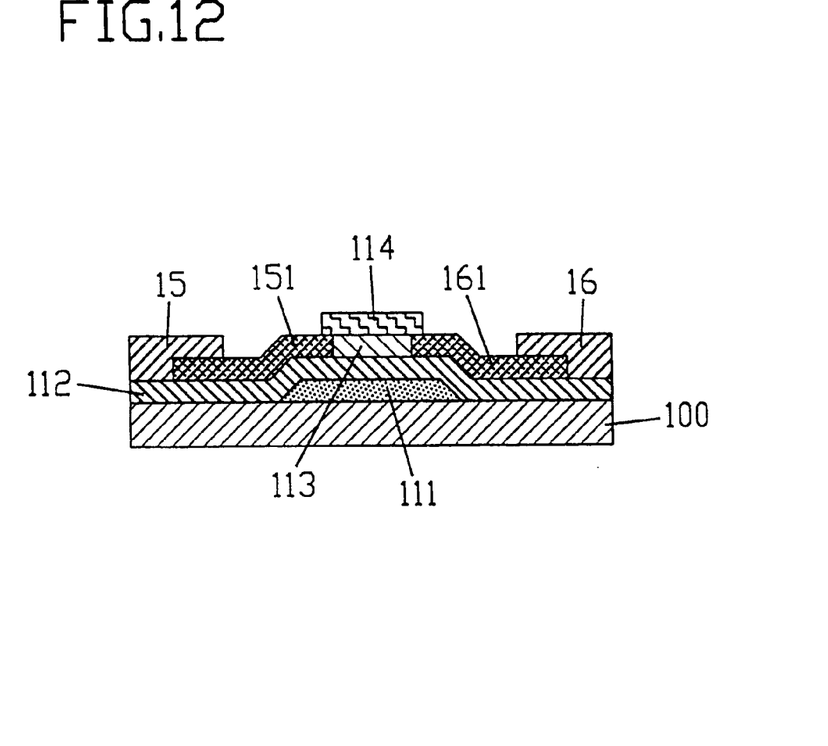
FIG. 12 is a cross-sectional view illustrating a self-aligned etch stopper type TFT according to a fourth embodiment of the present invention, cut along the line C—C in FIG. 4.
Figure 13:
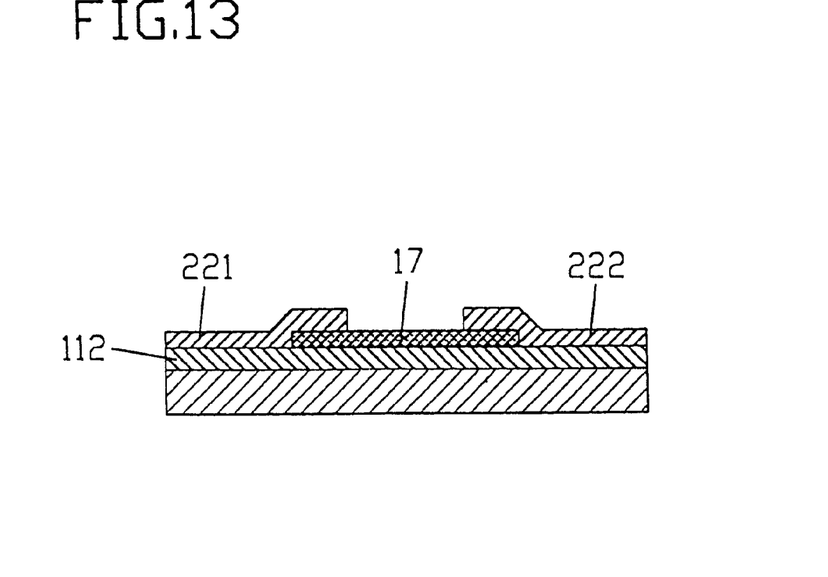
FIG. 13 is a cross-sectional view illustrating a resistive element according to the fourth embodiment of the present invention, cut along the line D—D in FIG. 4.

TFTs may be formed at positions where the gate lines 11 and the data lines 12 cross. The structure of the resistive regions 31 or 32 may vary according to the type of the TFT. FIGS. 6, 8 and 12 are cross-sectional views cut along the line C—C in the active region A of FIG. 4 illustrating etch-back, etch-stopper and self-aligned etch-stopper type TFTs, respectively. FIGS. 7, 9 and 13 are cross-sectional views cut along the line D—D in the pad region B in FIG. 4 illustrating resistive elements for electrostatic discharge protection of the different types of TFTs.

As shown in FIGS. 4 and 6, in an etch-back type TFT, a gate line 11 having a gate electrode 111 extending therefrom is formed on a substrate 100. A gate insulation layer 112 covering the gate electrode 111 is formed. A noncrystalline silicon channel region 113, e.g., an amorphous silicon region, is formed on the gate insulation layer 112. Doped noncrystalline, e.g., amorphous, silicon source/drain regions 17 are formed on both edges of the amorphous silicon channel region 113. Source and drain electrodes 15 and 16 are formed on the doped amorphous silicon source/drain regions 17 and are separated from each other. One of the two electrodes 15 and 16 is connected to a pixel electrode 23.

As shown in FIG. 7, in a resistive element for electrostatic discharge protection of the TFT illustrated in FIG. 6, a gate insulation layer 112 is formed on a substrate 100 and an amorphous silicon layer 113 is formed thereon. A doped amorphous silicon layer 17 is formed on the amorphous silicon layer 113. First and second electrodes 221 and 222 are in contact with respective ends of the doped amorphous silicon layer 17. Here, the doped amorphous silicon layer 17 serves as the resistive region 31 of FIG. 4. The resistive region 32 connected to the first discharge bus line 21 of the discharge bus 20 in FIG. 4 has a similar structure to that illustrated in FIG. 7, with the electrodes 221 and 222 being replaced by the electrodes 211 and 212, respectively.

A first method aspect of the present invention, a method of fabricating an LCD panel including the above-described TFT and the electrostatic charge protection device, is described with reference to FIGS. 4, 6 and 7. A first conductive layer is deposited on a substrate 100 and patterned to form a gate line 11, a gate electrode 111, a gate pad 13, and a first discharge bus line 21 parallel to the gate line 11. A gate insulation layer 112 of silicon nitride layer or silicon dioxide is formed. An amorphous silicon layer 113 and a doped amorphous silicon layer 17, e.g., a layer doped with N type dopant, are sequentially deposited on the gate insulation layer 112. The doped amorphous silicon layer 17 and the amorphous silicon layer 113 are then patterned, and portions of the gate insulator 112 on the gate line 11 and the first discharge bus line 21 are etched to form first, second and third contact holes 18, 19 and 117.

Next, a second conductive layer is deposited and patterned to form a data line 12 and source and drain electrodes 15 and 16. The second discharge bus line 22, which is connected to the first discharge bus line 21 through the first contact hole 18 and which extends parallel to the data line 12, may be formed from the second conductive layer along with the first, second and third interconnecting regions which will later be separated to form electrodes 221, 222 and 211. An exposed portion of the doped amorphous silicon layer 17 is etched to expose a portion of the amorphous silicon layer 113 of the TFT. A passivation layer is then deposited and patterned along with the gate insulator 112 to expose gate and data pads 13 and 14, and to separate the first electrode 221 and the data line 12 from the second electrode 222 and the third electrode 211, respectively. An indium tin oxide (ITO) layer is then deposited and patterned to form a pixel electrode 23. The first and second electrodes 221 and 222, and the data line 12 and the third electrode are then separated.

As shown in FIG. 8, an etch-stopper type TFT is similar to the etch-back type TFT in FIG. 6. However, an etch stopper region 114 is formed between an amorphous silicon layer 113 and a doped amorphous silicon layer 17, and the amorphous silicon layer 113 is not exposed. As shown in FIG. 9, a resistive element for electrostatic discharge protection for the etch stopper type TFT of FIG. 8 is similar to the resistive element illustrated in FIG. 7.

A second method aspect of the present invention, a manufacturing method for an LCD panel including the TFT and resistive element according to the second embodiment of the present invention illustrated in FIGS. 8 and 9, will be described with reference to FIGS. 4, 8 and 9. A first conductive layer is deposited on a substrate 100 and patterned to form a gate line 11, a gate electrode 111, a gate pad 13, and a first discharge bus line 21 parallel to the gate line 11. A gate insulating layer 112, e.g., silicon nitride or silicon dioxide, an amorphous silicon layer 113 and a silicon nitride layer 114 are sequentially deposited using a plasma-enhanced chemical vapor deposition. Next, a photoresist is coated on the silicon nitride layer 114 and exposed using the gate pattern 11, 13, 111 and 21 as a mask. The photoresist is developed, and the exposed portion of the silicon nitride layer is etched to form an etch stopper region 114. Next, a doped amorphous silicon layer 17, e.g., a layer doped with N type dopant, is deposited and patterned along with the amorphous silicon layer 113. The remaining steps are the same as those of the first method aspect.

Figure 10:
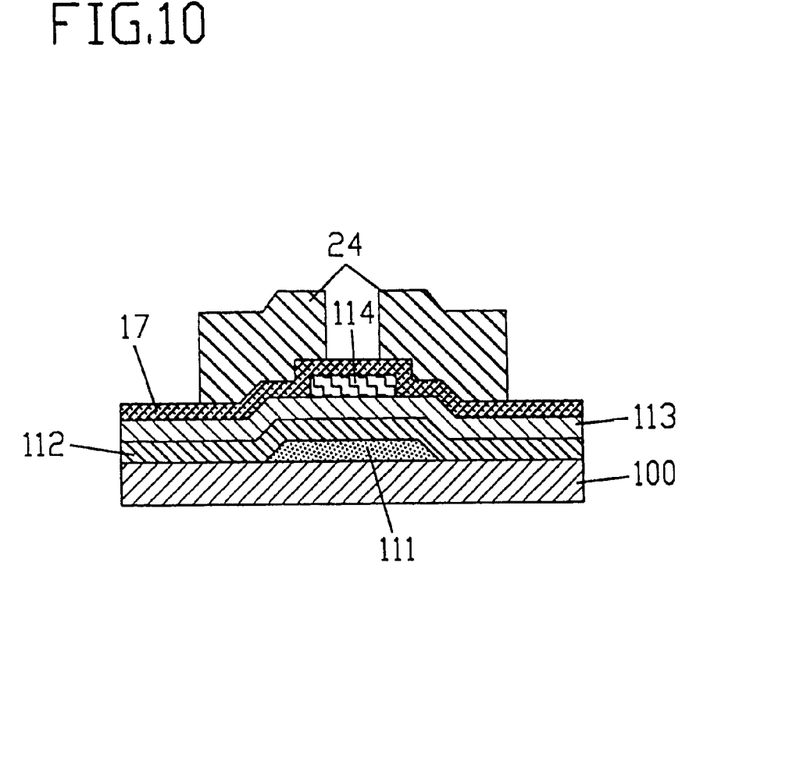
FIGS. 10–11 are cross-sectional views illustrating a manufacturing method of an etch stopper type TFT according to a third embodiment of the present invention, cut along the line C—C in FIG. 4.
Figure 11:
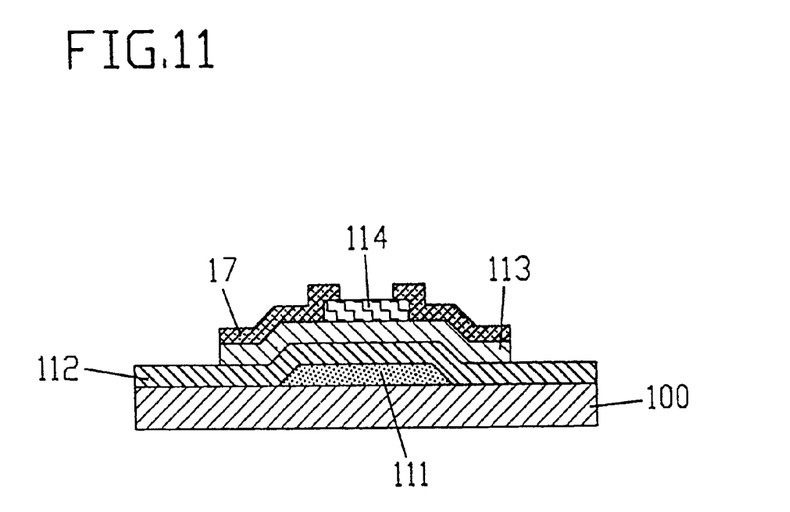

A third method aspect, a fabrication method for an LCD panel as illustrated in FIGS. 4, 8 and 9, will be described with reference to FIGS. 10 and 11. An etch stopper region 114 is formed, and a doped amorphous silicon layer 17 doped with N type dopant is deposited in accordance with the second embodiment described above. Next, as shown in FIG. 10, a photoresist is coated on the doped amorphous silicon layer 17 and patterned such that it has an opening on a portion of the doped amorphous silicon layer 17 above the etch stopper region 114. The doped amorphous silicon layer 17 and the amorphous silicon layer 113 are patterned by using the remaining photoresist 24 as a mask. The remaining photoresist 24 is then stripped. A second metal layer is deposited on the substrate 100 to form a data line 12, source and drain electrodes 15 and 16, and first, second and third electrodes 221, 222 and 211. A passivation layer is then deposited and patterned along with the gate insulator layer 112 to expose gate and data pads 13 and 14, and source and drain electrodes 15 and 16. An ITO layer is then deposited and patterned to form a pixel electrode 23. As a result, the exposed portion of the doped amorphous silicon layer 17 is etched after forming a data pattern 12, 15, 16, 221, 222 and 211 as with the second embodiment, but the second conductive pattern 12, 15, 16, 221, 222 and 211 is formed after patterning the doped amorphous silicon layer 17. Accordingly, it is not necessary to separate the first electrode 221 and the data line 12 from the second electrode 222 and the third electrode 211.

A fourth embodiment and fabrication method for a self-aligned etch stopper type TFT and a corresponding resistive element for electrostatic discharge protection of the TFT will now be described. As shown in FIG. 12, a gate line 11 having a gate electrode 111 extending therefrom is formed on a substrate 100. A gate insulation layer 112 covers the gate electrode 111. An amorphous silicon layer having an undoped portion 113 and doped portions 151 and 161 is formed on the gate insulation layer 112. The undoped portion 113 is disposed overlying the gate electrode 111, and the doped portions 151 and 161 are disposed on both sides of the undoped portion 113. An etch stopper region 114 is formed on the undoped portion 113, and source and drain electrodes 15 and 16 are in contact with the doped portions 151 and 161. As illustrated in FIG. 13, a resistive element for electrostatic charge protection of the above-described self-aligned etch-stopper type TFT is formed on a gate insulation layer 112 is formed on the substrate 100, and includes a doped amorphous silicon layer 17 is formed on the gate insulator layer 112. First and second electrodes 221 and 222 are in contact with respective sides of the doped amorphous silicon layer 17.

A manufacturing method for the above-described TFT and resistive element will be described with reference to FIGS. 4, 12 and 13. A first conductive layer is deposited on a substrate 100 and patterned to form a gate line 11, a gate electrode 111, a gate pad 13, and a first discharge bus line 21 parallel to the gate line 11. A gate insulation layer 112, an amorphous silicon layer and a silicon nitride layer 114 are sequentially deposited. Next, a photoresist is coated on the nitride layer 114 and exposed to a light by using the gate pattern 11, 13, 111 and 21 as a mask. The photoresist is developed, and the exposed portion of the silicon nitride layer 114 is etched to form an etch stopper region 114. N-type dopant is then implanted into the amorphous silicon layer by using the etch stopper region 114 as a mask to form doped portions 151 and 161, leaving the portion 113 therebetween undoped. Remaining steps for forming the TFT are similar to those described with reference to the first embodiment. The region 17 may be either a silicide region or a combination of a doped amorphous silicon region and a silicide region, instead of a doped amorphous silicon layer.

According to the present invention, resistive electrostatic discharge protection elements for TFTs of an LCD panel may be formed concurrently with the formation of the TFTs. Furthermore, it is not necessary to separate the discharge bus from the wiring connected to the active devices of the LCD panel when testing because sufficient resistance can be provided to minimize the current flowing into the discharge bus. The resistance of a resistive element can be controlled by varying the width of the two electrodes in contact with the resistive region of the resistive element and the distance between them, thus allowing the formation of a resistive element having a resistance in the range of tens of K ohm to thousands of K ohm, preferably 5 Kohm to 1 Mohm.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A liquid crystal display (LCD) panel, comprising:

a substrate;

a plurality of gate lines and data lines on said substrate, said gate lines extending along a first direction, said data lines extending along a second direction transverse to said first direction, said data lines and said gate lines crossing an active region, wherein said data lines and gate lines cross to define a plurality of pixel regions;

a discharge bus on said substrate, extending around said active region, crossing said data lines and said gate lines;

a plurality of resistive elements on said substrate, a respective one of which connects a respective one of said plurality of gate lines and data lines to said discharge bus, wherein a respective one of said resistive elements provides a resistance between the data or gate line connected thereto and said discharge bus that is no greater than 1 Mohm:

a plurality of thin-film transistors (TFTs) on said substrate, a respective one of said TFTs being disposed within a respective one of said pixel regions and having a gate electrode connected to a respective one of said gate lines; and a gate insulation layer overlying said gate electrodes of said plurality of TFTs, wherein said plurality of resistive elements comprises a plurality of resistive regions on said gate insulation layer.

2. An LCD according to claim 1, wherein a respective one of said resistive elements provides a resistance between the discharge bus and the data line or gate line connected thereto in a range from approximately 5 Kohms to 1 Mohms.

3. An LCD panel according to claim 1, wherein a respective one of said resistive regions comprises a silicide region on said insulation layer.

4. An LCD panel according to claim 1:

wherein a respective one of said plurality of TFTs comprises:

a noncrystalline silicon channel region on said gate insulation layer, overlying a gate electrode of said TFT; and spaced apart noncrystalline silicon source/drain regions on said gate insulation layer, disposed on opposite sides of said noncrystalline silicon channel region, said spaced apart noncrystalline silicon source/drain regions having a dopant concentration greater than said noncrystalline silicon channel region; and wherein a respective one of said resistive elements comprises a noncrystalline silicon region on said gate insulation layer, said noncrystalline silicon region having a dopant concentration higher than said noncrystalline silicon channel regions of said plurality of TFTs.

5. An LCD panel according to claim 1, wherein a respective one of said resistive regions comprises a doped noncrystalline silicon region on said gate insulation layer, said doped noncrystalline silicon region extending between said discharge bus and one of said plurality of data and gate lines.

6. An LCD panel according to claim 5, wherein a respective one of said resistive regions comprises a silicide region on said doped noncrystalline silicon region.

7. An LCD panel according to claim 5, wherein a respective one of said resistive regions comprises:

an undoped noncrystalline silicon region on said gate insulation layer, said undoped noncrystalline silicon region extending between said discharge bus and one of said plurality of data and gate lines;

a doped noncrystalline silicon region on said undoped noncrystalline silicon region, said doped noncrystalline silicon region extending between said discharge bus and said one of said plurality of data and gate lines.

8. An LCD panel according to claim 1:

wherein a respective one of said plurality of TFTs comprises:

a noncrystalline silicon channel region on said gate insulation layer, overlying a gate electrode of said TFT; and spaced apart noncrystalline silicon source/drain regions on said channel region, said spaced apart noncrystalline silicon source/drain regions having a dopant concentration greater than said noncrystalline silicon channel region; and wherein a respective one of said resistive elements comprises:

a first noncrystalline silicon region on said gate insulation layer; and a second noncrystalline silicon region on said first noncrystalline region, said second noncrystalline silicon region having a dopant concentration greater than said first noncrystalline silicon region.

9. An LCD panel according to claim 8, further comprising a respective etch stopper region disposed between said spaced-apart noncrystalline source/drain regions of a respective one of said TFTs.

10. A method of fabricating a liquid crystal display panel, the method comprising the steps of:

forming a plurality of gate lines and data lines, a discharge bus and a plurality of resistive elements on a substrate, the gate lines extending along a first direction, the data lines extending along a second direction transverse to the first direction, the gate and data lines crossing to define an active region, the discharge bus extending around said active region and crossing said data lines and said gate lines, and a respective one of the resistive elements connecting a respective one of the plurality of gate lines and data lines to the discharge bus, wherein a respective one of the resistive elements provides a resistance between the data or gate line connected thereto and the discharge bus that is no greater than 1 Mohm;

wherein said step of forming a plurality of gate lines and data lines, a discharge bus and a plurality of resistive elements on the substrate comprises the steps of:

forming a plurality of gate lines having gate electrodes extending therefrom;

forming a plurality of thin-film transistors on said substrate, a respective one of which includes one of said gate electrodes, a gate insulation layer on the gate electrode, and a semiconductor region on the gate insulation layer overlying the gate electrode; and forming the plurality of resistive regions on the gate insulation layer from the same layer as the semiconductor region of the thin film transistors.

11. A method according to claim 10 wherein said step of forming a plurality of gate lines and data lines, a discharge bus and a plurality of resistive elements on the substrate comprises the steps of:

forming a first conductive layer on the substrate;

patterning the conductive layer to form a gate line having a gate electrode region extending laterally therefrom and to form a first discharge bus line substantially parallel to the gate line;

forming an insulation layer on the substrate, covering the gate line;

forming a semiconductor layer on the insulation layer;

patterning the semiconductor layer to leave a first semiconductor region overlying the gate electrode region of the gate line, a second semiconductor region laterally adjacent the gate line, and a third semiconductor region laterally adjacent the first discharge bus line;

removing portions of the insulation layer to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole;

forming a second conductive layer on the substrate, contacting the exposed portions of the gate line and the first discharge bus line through the first, second and third contact holes;

patterning the second conductive layer to form:
  a data line which is transverse to the gate line and the first discharge bus line, which contacts the third semiconductor region, and which has an extension which overlies a first portion of the first semiconductor region;
  a second discharge bus line disposed transverse to the gate line and the first discharge bus line, which contacts the first discharge bus line through the third contact hole, and which has an extension which overlies the second semiconductor region and contacts the gate line through the first contact hole;
  a first interconnecting region which overlies a portion of the third semiconductor region apart from the data line and which contacts the first discharge bus line through the second contact hole; and
  a second interconnecting region which overlies a portion of the first semiconductor region apart from the extension of the data line;

removing a portion of the first semiconductor region to form spaced apart source/drain regions overlying a channel region, the second interconnecting region overlying a first one of the spaced apart source/drain regions and the extension of the data line overlying a second one of the spaced apart source/drain regions; and removing a portion of the extension of the second discharge bus line overlying the second semiconductor region to form a first electrode extending from the second discharge bus line which contacts the second semiconductor region and to form a second electrode connecting the second semiconductor region and the gate line.

12. A method according to claim 11:
wherein said step of forming a semiconductor layer comprises the steps of:
  forming a first noncrystalline silicon layer; and
  forming a second noncrystalline silicon layer on the first noncrystalline silicon layer, the second noncrystalline silicon layer having a dopant concentration higher than the first noncrystalline silicon layer;
wherein said step of patterning the semiconductor layer comprises the step of patterning the first and second noncrystalline silicon layers to leave a first semiconductor region overlying the gate electrode region of the gate line, a second semiconductor region laterally adjacent the gate line, and a third semiconductor region laterally adjacent the first discharge bus line, the first, second and third semiconductor regions each including a first noncrystalline silicon region underlying a second noncrystalline silicon region, the second noncrystalline silicon region having a dopant concentration higher than the first noncrystalline silicon region; and
wherein said step of removing a portion of the first semiconductor region comprises the step of removing a portion of the second noncrystalline silicon region of the first semiconductor region to form spaced apart source/drain regions overlying the first noncrystalline silicon region of the first semiconductor region.

13. A method according to claim 10, wherein said step of forming a plurality of gate lines and data lines, a discharge bus and a plurality of resistive elements on the substrate comprises the steps of:
  forming a first conductive layer on the substrate;
  patterning the first conductive layer to form a gate line having a gate electrode region extending laterally therefrom and to form a first discharge bus line substantially parallel to the gate line;
  forming an insulation layer on the substrate, covering the gate line;
  forming a first semiconductor layer on the insulation layer;
  forming an etch stopper layer on the first semiconductor layer;
  patterning the etch stopper layer to form an etch stopper region overlying the gate electrode region of the gate line;
  forming a second semiconductor layer on the substrate;
  patterning the first and second semiconductor layers to leave a first semiconductor region overlying the gate electrode region of the gate line, a second semiconductor region laterally adjacent the gate line, and a third semiconductor region laterally adjacent the first discharge bus line;
  removing portions of the insulation layer to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole;
  forming a second conductive layer on the substrate, contacting the exposed portions of the gate line and the first discharge bus line through the first, second and third contact holes;
  patterning the second conductive layer to form:
    a data line which is transverse to the gate line and the first discharge bus line, which contacts the third semiconductor region, and which has an extension which overlies a first portion of the first semiconductor region;
    a second discharge bus line disposed transverse to the gate line and the first discharge bus line, which contacts the first discharge bus line through the third contact hole, and which has an extension which overlies the second semiconductor region and contacts the gate line through the first contact hole;
    a first interconnecting region which overlies a portion of the third semiconductor region apart from the data line and which contacts the first discharge bus line through the second contact hole; and a second interconnecting region which overlies a portion of the first semiconductor region apart from the extension of the data line;

removing a portion of the second semiconductor layer overlying the etch stopper region to form spaced apart source drain regions overlying a channel region, the second interconnecting region overlying a first one of the spaced apart source/drain regions and the extension of the data line overlying a second one of the spaced apart source/drain regions; and removing a portion of the extension of the second discharge bus line overlying the second semiconductor region to form a first electrode extending from the second discharge bus line which contacts the second semiconductor region and to form a second electrode connecting the second semiconductor region and the gate line.

14. A method according to claim 13:

wherein said step of forming a first semiconductor layer comprises the step of forming an undoped noncrystalline silicon layer;

wherein said step of forming a second semiconductor layer comprises the step of forming a doped noncrystalline silicon layer on the undoped noncrystalline silicon layer; and wherein said step of patterning the first and second semiconductor layers comprises the step of patterning the undoped and doped noncrystalline silicon layers to leave a first semiconductor region overlying the gate electrode region of the gate line, a second semiconductor region laterally adjacent the gate line, and a third semiconductor region laterally adjacent the first discharge bus line, the first, second and third semiconductor regions each including an undoped noncrystalline silicon region underlying a doped noncrystalline silicon region;

wherein said step of removing a portion of the first semiconductor region comprises the step of removing a portion of the doped noncrystalline silicon region of the first semiconductor region overlying the etch stopper region to form spaced apart source/drain regions overlying the undoped noncrystalline silicon region of the first semiconductor region; and wherein said step of removing a portion of the extension of the second discharge bus line comprises the step of removing a portion of the second discharge bus line overlying the second semiconductor region to leave the doped noncrystalline silicon region of the second semiconductor region extending between the first and second electrodes.

15. A method according to claim 10 wherein said step of forming a plurality of gate lines and data lines, a discharge bus and a plurality of resistive elements on the substrate comprises the steps of:

forming a first conductive layer on the substrate;

patterning the conductive layer to form a gate line having a gate electrode region extending laterally therefrom and to form a first discharge bus line substantially parallel to the gate line;

forming an insulation layer on the substrate, covering the gate line;

forming a first semiconductor layer on the insulation layer;

forming an etch stopper layer on the semiconductor layer;

patterning the etch stopper layer to form an etch stopper region overlying the gate electrode region of the gate line;

forming a second semiconductor layer on the substrate;

patterning the first and second semiconductor layers to leave a first semiconductor region overlying the gate electrode region of the gate line, a second semiconductor region laterally adjacent the gate line, and a third semiconductor region laterally adjacent the first discharge bus line, the first semiconductor region including a channel region formed from the first semiconductor layer overlying the gate electrode region of the gate line and spaced apart source/drain regions formed from the second semiconductor layer overlying the channel region and disposed on respective sides of the etch stopper region;

removing portions of the insulation layer to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole;

forming a second conductive layer on the substrate, contacting the exposed portions of the gate line and the first discharge bus line through the first, second and third contact holes; and patterning the second conductive layer to form:
a data line which is transverse to the gate line and the first discharge bus line, which contacts the third semiconductor region, and which has an extension which overlies a first portion of the first semiconductor region;
a second discharge bus line disposed transverse to the gate line and the first discharge bus line, which contacts the first discharge bus line through the third contact hole, and which has an extension which overlies the second semiconductor region;
a first interconnecting region which overlies a portion of the second semiconductor region and which contacts the gate line through the first contact hole;
a second interconnecting region which overlies a portion of the third semiconductor region apart from the data line and which contacts the first discharge bus line through the second contact hole; and
a third interconnecting region which overlies a portion of the first semiconductor region apart from the extension of the data line.

16. A method according to claim 15:

wherein said step of forming a first semiconductor layer comprises the step of forming an undoped noncrystalline silicon layer; and wherein said step of forming a second semiconductor layer comprises the step of forming a doped noncrystalline silicon layer on the undoped noncrystalline silicon layer; and further comprising the step of:
removing a portion of the extension of the second discharge bus line overlying the second semiconductor region to form a first electrode extending from the second discharge bus line to contact the doped noncrystalline silicon region of the second semiconductor region and a second electrode extending from the gate line to contact the doped noncrystalline silicon region of the second semiconductor region.

17. A method according to claim 10, wherein said step of forming a plurality of gate lines and data lines, a discharge bus and a plurality of resistive elements on the substrate comprises the steps of:

forming a first conductive layer on the substrate;

patterning the conductive layer to form a gate line having a gate electrode region extending laterally therefrom and to form a first discharge bus line substantially parallel to the gate line;

forming an insulation layer on the substrate, covering the gate line;

forming a semiconductor layer on the insulation layer;

forming an etch stopper layer on the semiconductor layer;

pattering the etch stopper layer to form an etch stopper region overlying the gate electrode region of the gate line;

implanting dopant ions into the semiconductor layer on opposite sides of the etch stopper region;

patterning the semiconductor layer to leave a first semiconductor region overlying the gate electrode region of the gate line, a second semiconductor region laterally adjacent the gate line, and a third semiconductor region laterally adjacent the first discharge bus line, the first semiconductor region including a channel region underlying the etch stopper region and disposed between spaced apart source/drain regions, the spaced apart source/drain regions having a higher dopant concentration than the channel region;

removing portions of the insulation layer to form a first contact hole exposing a portion of the gate line adjacent the second semiconductor region, a second contact hole exposing a first portion of the first discharge bus line adjacent the third semiconductor region, and a third contact hole exposing a second portion of the first discharge bus line spaced apart from the first contact hole;

forming a second conductive layer on the substrate, contacting the exposed portions of the gate line and the first discharge bus line through the first, second and third contact holes; and pattering the second conductive layer to form:
 a data line which is transverse to the gate line and the first discharge bus line, which contacts the third semiconductor region, and which has an extension which overlies a first portion of the first semiconductor region;
 a second discharge bus line disposed transverse to the gate line and the first discharge bus line, which contacts the first discharge bus line through the third contact hole, and which has an extension which overlies the second semiconductor region;
 a first interconnecting region which overlies a portion of the second semiconductor region and which contacts the gate line through the first contact hole;
 a second interconnecting region which overlies a portion of the third semiconductor region apart from the data line and which contacts the first discharge bus line through the second contact hole; and
 a third interconnecting region which overlies a portion of the first semiconductor region apart from the extension of the data line.

18. A method according to claim 17, wherein said step of forming a semiconductor layer comprises the step of forming an noncrystalline silicon layer.

19. A method according to claim 10, wherein said step of forming the plurality of resistive regions comprises the step of forming resistive regions, a respective one of which comprises a doped noncrystalline silicon region that extends between the discharge bus and one of the plurality of gate lines and data lines.

20. A method according to claim 19, wherein said step of forming the plurality of resistive regions comprises the step of forming resistive regions, a respective one of which comprises an undoped noncrystalline silicon region on the gate insulation layer and a doped noncrystalline silicon region disposed on the undoped noncrystalline silicon region and extending between the discharge bus and one of the plurality of gate lines and data lines.

21. A liquid crystal display (LCD) panel, comprising:
 a substrate;
 a plurality of gate lines and data lines on said substrate, said gate lines extending along a first direction, said data lines extending along a second direction transverse to said first direction, said data lines and said gate lines crossing an active region;
 a discharge bus on said substrate, extending around said active region, crossing said data lines and said gate lines; and
 a plurality of resistive elements on said substrate, a respective one of which connects a respective one of said plurality of gate lines and data lines to said discharge bus, wherein a respective one of said resistive elements comprises a doped noncrystalline silicon region extending between said discharge bus and a respective one of said plurality of data and gate lines.

22. An LCD panel according to claim 21, wherein a respective one of said resistive elements provides a resistance between one of said data or gate lines and said discharge bus that is no greater than 1 Mohm.

23. An LCD panel according to claim 22, wherein said resistance is in a range from 5 Kohm to 1 Mohm.

24. A method of fabricating a liquid crystal display panel, the method comprising the steps of:

forming a plurality of gate lines and data lines, a discharge bus and a plurality of resistive elements on a substrate, the gate lines extending along a first direction, the data lines extending along a second direction transverse to the first direction, the gate and data lines crossing to define an active region, the discharge bus extending around said active region and crossing said data lines and said gate lines, wherein a respective one of the resistive elements comprises a doped noncrystalline silicon region extending between the discharge bus and a respective one of the plurality of data and gate lines.

25. A method according to claim 24, wherein said step of forming comprises the steps of:

forming a plurality of gate lines having gate electrodes extending therefrom;

forming a plurality of thin-film transistors on said substrate, a respective one of which includes one of said gate electrodes, a gate insulation layer on the gate electrode, and first and second spaced apart doped noncrystalline silicon source/drain regions on the gate insulation layer on respective sides of the gate electrode; and forming the plurality of resistive regions on the gate insulation layer from the same doped noncrystalline silicon layer used to form the source/drain regions of the thin film transistors.

26. A method according to claim 24, wherein a respective resistive element has a resistance no greater than 1 Mohm.

27. A method according to claim 26, wherein a respective resistive element has a resistance in a range from 5 Kohms to 1 Mohm.

* * * * *